United States Patent Office 3,048,582
Patented Aug. 7, 1962

3,048,582
6α-FLUORO-PREGNANES AND INTERMEDIATES IN THE PREPARATION THEREOF
Robert Joly, Montmorency, Julien Warnant, Neuilly-sur-Seine, and Bernard Goffinet, Paris, France, assignors, by mesne assignments, to Roussel-UCLAF, S.A., Paris, France, a corporation of France
No Drawing. Filed Aug. 30, 1961, Ser. No. 134,836
Claims priority, application France Sept. 6, 1960
9 Claims. (Cl. 260—239.55)

The invention relates to novel 6α-fluoro-pregnanes having the formula

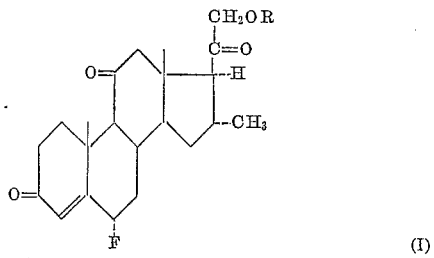

wherein R is selected from the group consisting of hydrogen, an acyl radical of a mineral acid and an acyl radical of an organic carboxylic acid having 1 to 18 carbon atoms. The invention further relates to a novel process for the preparation of the 6α-fluoro-pregnanes of Formula I and novel intermediates.

The 6α-fluoro-pregnanes of Formula I possess anti-inflammatory activity.

It is an object of the invention to provide novel 6α-fluoro-pregnanes of Formula I.

It is a further object of the invention to provide a novel process for the preparation of the 6α-fluoro-pregnanes of Formula I.

It is an additional object of the invention to provide novel intermediates for the 6α-fluoro-pregnanes of Formula I.

These and other objects and advantages of the invention will become obvious from the following detailed description.

The 6α-fluoro-pregnanes of the invention have the formula

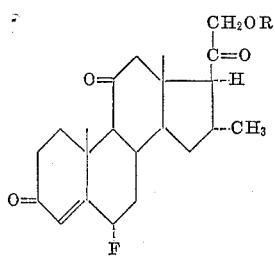

wherein R is selected from the group consisting of hydrogen, an acyl radical of a mineral acid and an acyl radical of an organic carboxylic acid having 1 to 18 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecyclic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butyl-phenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionyl-acetic acid and butyrylacetic acid; amino acids such as diethylaminoacetic acid and aspartic acid. Examples of other suitable acids are sulfonic acids, phosphoric acid, nitric acid and sulfuric acid.

The process of the invention comprises reacting 21-acyloxy - 16α - methyl-Δ⁴-pregnene-3,11,20-trione wherein the acyl radical is derived from an organic carboxylic acid having 1 to 18 carbon atoms with a lower alkylene glycol to form the 3-lower alkylene ketal of 21-acyloxy-16α-methyl-Δ⁴-pregnene-3,11,20-trione, epoxidizing the said 3-ketal to form the 3-lower alkylene ketal of 5α,6α-epoxy-21-acyloxy-16α-methyl-pregnane-3,11,20-trione, reacting the latter with hydrofluoric acid in a polar solvent such as an N,N-dilower alkyl lower alkanoic acid amide to form 6β-fluoro-21-acyloxy-16α-methyl-pregnane-5α-ol-3,11,20-trione, dehydrating the latter under acidic conditions to form 6α-fluoro-21-acetoxy-16α-methyl-Δ⁴-pregnene-3,11,20-trione, saponifying the latter to form 6α-fluoro - 16α - methyl-Δ⁴-pregnene-21-ol-3,11,20-trione and recovering the latter. The free alcohol may be esterified in the usual manner such as with an acid anhydride or acid halide to obtain the desired esters.

A preferred mode of the process of the invention comprises reacting ethylene glycol with 21-acetoxy-16α-methyl-Δ⁴-pregnene-3,11,20-trione to form 3-ethylene dioxy-21-acetoxy-16α-methyl-Δ⁵-pregnene-11,20-dione, oxidizing the latter with perphthalic acid to form 3-ethylene dioxy - 5α,6α - epoxy-21-acetoxy-16α-methyl-pregnane-11,20-dione, reacting the latter with hydrofluoric acid in dimethylformamide to form 6β-fluoro-21-acetoxy-16α-methyl-pregnene-5α-ol-3,11,20-trione, dehydrating said fluoro compound by reacting with an inorganic acid such as hydrochloric acid in an inert organic solvent such as dimethylformamide to form 6α-fluoro-21-acetoxy-16α-methyl-Δ⁴-pregnene-3,11,20-trione, saponifying the latter to form 6α-fluoro-16α-methyl-Δ⁴-pregnene-21-ol-3,11,20-trione and recovering the latter. The reaction is illustrated in Table I.

TABLE I

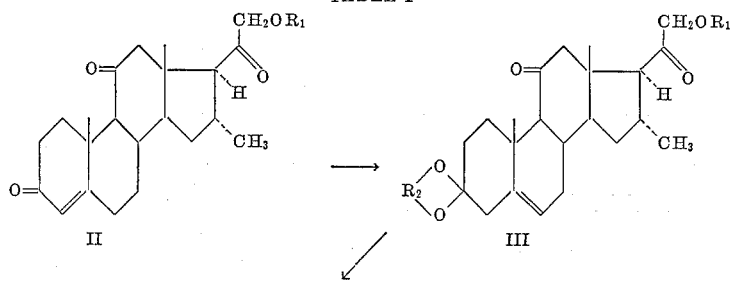

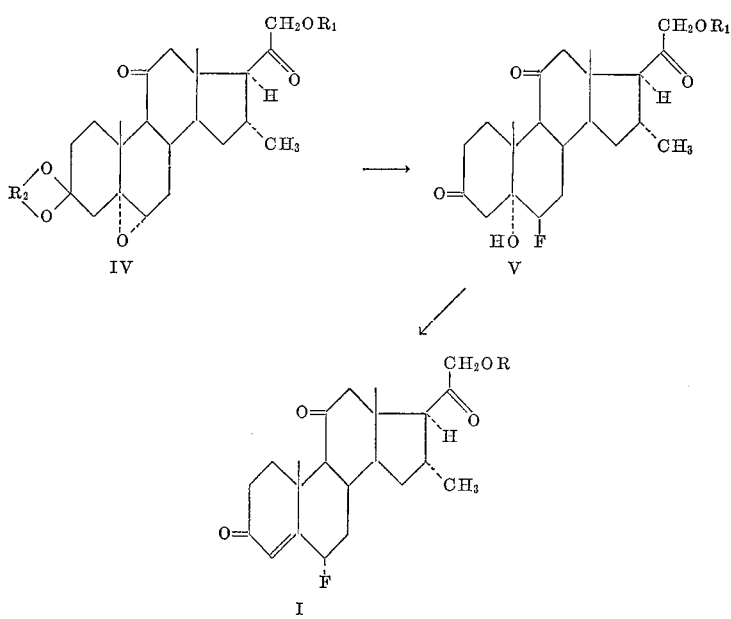

wherein R has the above definition, $R_1$ is the acyl radical of an organic carboxylic acid having 1 to 18 carbon atoms and $R_2$ is a lower alkylene radical.

The starting compounds, 21-acyloxy-16α-methyl-$\Delta^4$-pregnene-3,11,21-triones, are prepared according to the copending, commonly assigned U.S. patent application Serial No. 122,663 filed July 10, 1961.

In the following example there are described several preferred embodiments to illustrate the invention. However, it should be understood that the invention is not intended to be limited to the specific embodiments.

EXAMPLE

*Preparation of 21-Acetoxy-6α-Fluoro-16α-Methyl-$\Delta^4$ Pregnene-3,11,20-Trione*

*Step A*.—3 - ethylenedioxy - 21 - acetoxy - 16α - methyl-$\Delta^5$-pregnene-11,20-dione: 30 gm. of 21-acetoxy-16α-methyl-$\Delta^4$-pregnene-3,11,20-trione were introduced into a mixture of 60 cc. of ethylene glycol and 120 cc. of methylethyldioxolane. The starting material was obtained according to the process described in copending, commonly assigned U.S. patent application Serial No. 122,663 filed July 10, 1961. The reaction mixture was heated to 78° C. 150 mg. of p-toluene sulfonic acid were added and the major part of the solvent was distilled slowly from the reaction mixture under reduced pressure. After 50 minutes of heating at 78° C. a residue was obtained which was suspended in two volumes of methanol containing 0.5% of pyridine. The suspension was agitated for one hour at 0° C. and the precipitated product was vacuum filtered, washed with methanol, dried, and 3-ethylenedioxy - 21 - acetoxy - 16α - methyl - $\Delta^5$ - pregnene-11,20-dione was recovered. The product was recrystallized from alcohol and had a melting point of 209° C. and a specific rotation $[\alpha]_D^{20} = +89°$ (c.=1% in pyridine). The yield was 21.8 gm. (being 65.7%). The compound occurred as colorless prismatic crystals, very soluble in chloroform, slightly soluble in alcohol, acetone and benzene, and insoluble in ether and in water.

[Analysis: $C_{26}H_{36}O_6$; molecular weight=444.54]

|  | C, percent | H, percent |
| --- | --- | --- |
| Calculated | 70.24 | 8.13 |
| Found | 70.4 | 8.3 |

This product is not described in the literature.

*Step B*.—3 - ethylenedioxy - 5α,6α - epoxy - 21 - acetoxy-16α-methyl-pregnane-11,20-dione: 40 cc. of ethereal solution of perphthalic acid containing 28.2 gm. of perphthalic acid per 100 cc. of solution were very slowly added to a solution of 10 gm. of 3-ethylenedioxy-21-acetoxy-16α-methyl-$\Delta^5$-pregnene-11,20-dione in 100 cc. of chloroform. The reaction mixture was agitated at room temperature for a period of five days and the product formed was then vacuum filtered. The filter cake was extracted with chloroform and the extracts were washed with dilute ammonia water and with water, dried and evaporated to dryness under vacuum. The residue was crystallized from ether containing 0.5% of pyridine and supplied 9.196 gm. (being 86.7% of 3-ethylenedioxy-5α, 6α - epoxy - 21 - acetoxy - 16α - methyl - pregnane - 11, 20-dione, having a melting point of 227° C. The compound was usable as such for the next step of the synthesis. For analysis, it was recrystallized from alcohol and a sample melting at 230° C. and having a specific rotation $[\alpha]_D^{20} = +73°$ (c.=1% in pyridine) was obtained with a yield of 83%.

The product occurred in the form of colorless prisms, very soluble in chloroform, slightly soluble in alcohol, acetone and benzene, and insoluble in ether and in water.

[Analysis: $C_{26}H_{36}O_7$; molecular weight=460.54]

|  | C, percent | H, percent |
| --- | --- | --- |
| Calculated | 67.8 | 7.88 |
| Found | 67.6 | 7.8 |

This compound is not described in the literature.

*Step C*.—6β - fluoro - 21 - acetoxy - 16α - methyl-pregnane-5α-ol-3,11,20-trione: 7 gm. of 3-ethylenedioxy-5α,6α - epoxy - 21 - acetoxy - 16α - methyl - pregnane-11,20-dione, melting at 227° C., was introduced into 7 volumes of a mixture of 40 gm. of hydrofluoric acid and 30 gm. of dimethylformamide containing 2.5 cc. of water cooled to −25° C. The reaction mixture was agitated while being cooled externally at −25° C. for a period of one hour. The reaction mixture was poured into a mixture of water, ammonia and ice, agitated, and the 6β-fluoro - 21 - acetoxy - 16α - methyl - pregnane - 5α - ol-3,11,20-trione was vacuum filtered. This compound was washed with isopropyl ether, giving a yield of 5.160 gm. (being 77.7%) of the product melting at 155° C. and having a specific rotation $[\alpha]_D^{20}=+80°$ (c.=0.5% in chloroform) which was utilizable without further purification for the next step of the synthesis. It was a colorless product, soluble in dimethylformamide, slightly soluble in ether, and insoluble in water.

This product is not described in the literature.

*Step D.*—6α - fluoro - 21 - acetoxy - 16α - methyl-Δ⁴-pregnene-3,11,20-trione: 5 gm. of 6β-fluoro-21-acetoxy-16α-methyl-pregnane-5α-ol-3,11,20-trione were dissolved in 25 cc. of dimethylformamide and, while cooling 2.5 cc. of concentrated hydrochloric acid were added. The reaction mixture was allowed to stand for a period of seventy-two hours at room temperature, then poured into a mixture of water and ice. The 6α-fluoro-21-acetoxy-16α-methyl-Δ⁴-pregnene-3,11,20-trione precipitated. The precipitate was vacuum filtered, washed with water, dissolved in 100 cc. of benzene, and subjected to chromatography through alumina with elutions with benzene containing increasing percentages of ether. Almost all of the product was eluted with benzene containing 5% of ether. The solvent was evaporated to dryness and 1.880 gm. of product (being a yield of 39.2%) were obtained and upon recrystallization from ethanol and ethyl acetate, gave a product having a melting point of 195° C. and a specific rotation $[\alpha]_D^{20}=+198°$ (c.=0.5% in chloroform). The product occurred as colorless prisms, soluble in chloroform and acetone, slightly soluble in ether, benzene and ethyl acetate, insoluble in water.

[Analysis: $C_{24}H_{31}O_5F$; molecular weight=418.5]

|  | C, percent | H, percent | F, percent |
|---|---|---|---|
| Calculated | 68.87 | 7.47 | 4.54 |
| Found | 68.8 | 7.4 | 4.5 |

Ultraviolet spectrum: $\lambda_{max.}$ (ethanol) 233 mμ, ε=14,400.

This product is not described in the literature.

By saponification according to usual processes 6α-fluoro - 16α - methyl - Δ⁴ - pregnene - 21 - ol - 3,11,20-trione was obtained which can be transformed into the desired corresponding ester by standard esterification techniques.

Various modifications of the process of the invention may be made without departing from the spirit or scope thereof and it is to be understood that the invention is to be limited only as defined in the appended claims.

We claim:
1. A compound having the formula

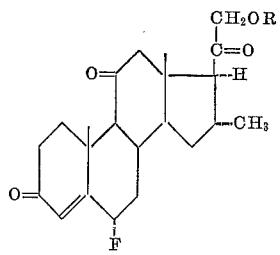

wherein R is selected from the group consisting of hydrogen, an acyl radical of a mineral acid and an acyl radical of an organic carboxylic acid having 1 to 18 carbon atoms.

2. 6α - fluoro - 16α - methyl - Δ⁴ - pregnene - 21 - ol-3,11,20-trione.

3. 6α - fluoro - 21 - acetoxy - 16α - methyl - Δ⁴-pregnene-3,11,20-trione.

4. A compound having the formula

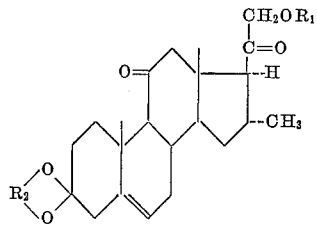

wherein $R_1$ is the acyl radical of an organic carboxylic acid having 1 to 18 carbon atoms and $R_2$ is a lower alkylene radical.

5. 3 - ethylene dioxy - 21 - acetoxy - 16α - methyl-Δ⁵-pregnene-11,20-dione.

6. A compound having the formula

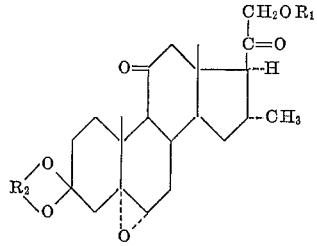

wherein $R_1$ is an acyl radical of an organic carboxylic acid having 1 to 18 carbon atoms and $R_2$ is a lower alkylene radical.

7. 3 - ethylene dioxy - 5α,6α - epoxy - 21 - acetoxy-16α-methyl-pregnane-11,20-dione.

8. A compound having the formula

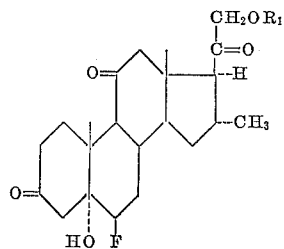

wherein $R_1$ is the acyl radical of an organic carboxylic acid having 1 to 18 carbon atoms.

9. 6β - fluoro - 21 - acetoxy - 16α - methyl - pregnane-5α-ol-3,11,20-trione.

References Cited in the file of this patent

UNITED STATES PATENTS

| 2,838,492 | Pederson et al. | June 10, 1958 |
| 2,838,501 | Campbell et al. | June 10, 1958 |